United States Patent
Chang et al.

(10) Patent No.: US 11,556,654 B2
(45) Date of Patent: Jan. 17, 2023

(54) SECURITY SCHEMES FOR MULTIPLE TRUSTED-EXECUTION-ENVIRONMENTS (TEES) AND MULTIPLE RICH-EXECUTION-ENVIRONMENTS (REES)

(71) Applicant: MediaTek Inc., Hsinchu (TW)

(72) Inventors: Yu-Tien Chang, Hsinchu (TW); Chih-Pin Su, Hsinchu (TW); Hungwen Li, San Jose, CA (US)

(73) Assignee: MediaTek Inc., Hsinchu (TW)

(*) Notice: Subject to any disclaimer, the term of this patent is extended or adjusted under 35 U.S.C. 154(b) by 157 days.

(21) Appl. No.: 17/103,927

(22) Filed: Nov. 24, 2020

(65) Prior Publication Data

US 2021/0192056 A1 Jun. 24, 2021

Related U.S. Application Data

(60) Provisional application No. 63/076,895, filed on Sep. 10, 2020, provisional application No. 62/953,184, filed on Dec. 23, 2019.

(51) Int. Cl.
*G06F 21/00* (2013.01)
*G06F 21/57* (2013.01)
*G06F 21/53* (2013.01)
*G06F 21/79* (2013.01)

(52) U.S. Cl.
CPC ............ *G06F 21/577* (2013.01); *G06F 21/53* (2013.01); *G06F 21/79* (2013.01)

(58) Field of Classification Search
CPC ........ G06F 21/577; G06F 21/53; G06F 21/79; G06F 12/1441; G06F 2009/45583; G06F 2221/2141; G06F 12/1483; G06F 12/1491; G06F 2212/1052; G06F 2221/2149; H04L 63/101
See application file for complete search history.

(56) References Cited

U.S. PATENT DOCUMENTS

| | | | |
|---|---|---|---|
| 2016/0266943 A1* | 9/2016 | Hans | G06F 13/362 |
| 2017/0286673 A1 | 10/2017 | Lukacs et al. | |
| 2018/0336342 A1* | 11/2018 | Narendra Trivedi | G06F 21/57 |
| 2018/0341937 A1* | 11/2018 | Kim | H04L 9/3297 |
| 2019/0227827 A1 | 7/2019 | Zmudzinski et al. | |
| 2021/0011996 A1* | 1/2021 | Li | G06F 12/1458 |
| 2021/0263757 A1* | 8/2021 | Tsirkin | G06F 21/57 |

OTHER PUBLICATIONS

The Extended European Search Report dated Apr. 22, 2021 on European Patent Application No. EP 20 21 2093.

* cited by examiner

*Primary Examiner* — Ghazal B Shehni
(74) *Attorney, Agent, or Firm* — Tong J. Lee

(57) ABSTRACT

A system is provided to perform secure operations. The system includes an I/O subsystem, a memory subsystem and processors. The processors are operative to execute processes in trusted execution environments (TEEs) and rich execution environments (REEs). Each of the TEEs and the REEs is identified by a corresponding access identifier (AID) and protected by a corresponding system resource protection unit (SRPU). The corresponding SRPU of a TEE includes instructions, when executed by a corresponding processor, cause the corresponding processor to control access to the TEE using a data structure including allowed AIDs and pointers to memory locations accessible by the allowed AIDs.

20 Claims, 7 Drawing Sheets

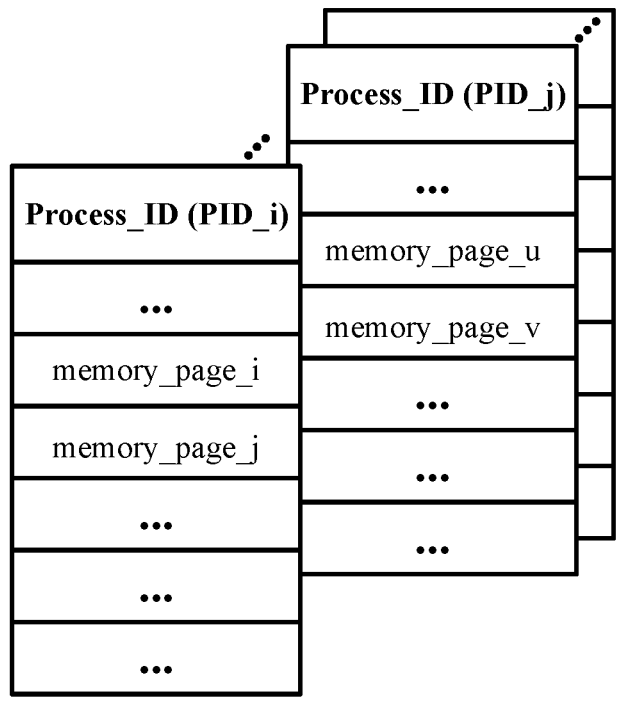
FIG. 3A
FIG. 3C
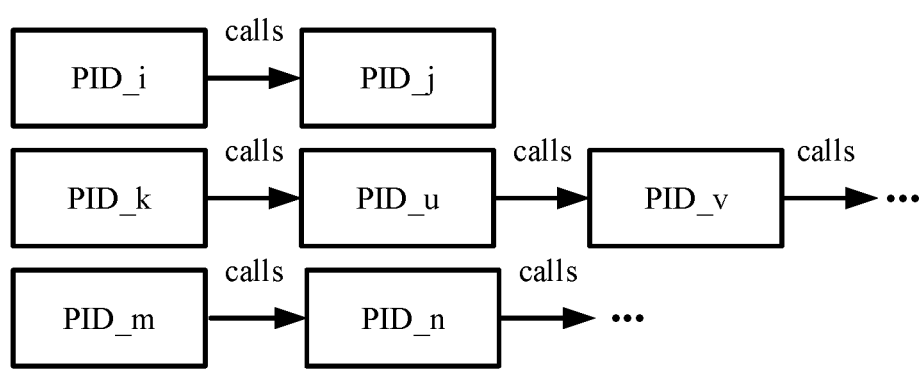
FIG. 3B

SECURITY SCHEMES FOR MULTIPLE TRUSTED-EXECUTION-ENVIRONMENTS (TEES) AND MULTIPLE RICH-EXECUTION-ENVIRONMENTS (REES)

CROSS-REFERENCE TO RELATED APPLICATIONS

This application claims the benefit of U.S. Provisional Application No. 62/953,184 filed on Dec. 23, 2019, and U.S. Provisional Application No. 63/076,895 filed on Sep. 10, 2020, the entirety of both of which is incorporated by reference herein.

TECHNICAL FIELD

Embodiments of the invention relate to a security mechanism for a computing system.

BACKGROUND

Traditional Operating System (OS) is a collection of software that manages system hardware resources for users' application programs to achieve better utilization, performance, or efficiency. The traditional OS has become insecure due to its growing complexity and size. Furthermore, the traditional OS has become insecure due to the use of certain programming languages, such as C/C++, in users' programs. These programming languages enable users' programs to manipulate system resources (e.g., memory). As a result, both the OS and user programs may involve in memory management, causing inconsistency and lead to insecurity.

Trusted Execution Environment (TEE) such as ARM® TrustZone® was developed in the early 2000s to enhance system security. TEE has taken over a significant amount of system hardware resources (e.g., processors, memory, and I/O devices) from the traditional OS when such system resources are required to be secured. TEE also uses additional hardware, which is totally under the control of TEE, to boot the system. The result is that the traditional OS, renamed as REE (Rich Execution Environment), is treated as an application program and has no role in the management of system security. However, system security can be challenged when applications demand more than one TEE and/or more than one REE. Therefore, there is a need for a reliable, effective, and scalable security mechanism for a secure computing system.

SUMMARY

In one embodiment, a system is provided to perform secure operations. The system includes an I/O subsystem; a memory subsystem; and processors. The processors are operative to execute processes in trusted execution environments (TEEs) and rich execution environments (REEs). Each of the TEEs and the REEs is identified by a corresponding access identifier (AID) and protected by a corresponding system resource protection unit (SRPU). The corresponding SRPU of a TEE includes instructions, when executed by a corresponding processor, cause the corresponding processor to control access to the TEE using a data structure including allowed AIDs and pointers to memory locations accessible by the allowed AIDs.

In another embodiment, a method is provided for performing secure operations by a system that includes SRPUs. The method comprises receiving, by a target SRPU of a target entity, an access request indicating a source AID, a target AID, and a memory location of the target entity to be accessed. The source AID is assigned to a source entity including a source SRPU, and the target AID is assigned to the target entity. The method further comprises determining, by the target SRPU, whether to grant or reject the access request based on information in a data structure including allowed AIDS and pointers to memory locations accessible by the allowed AIDS. The method further comprises rejecting the access request at least when the source AID is not one of the allowed AIDS. The source entity and the target entity are system entities that include at least an I/O subsystem, a memory subsystem, and TEEs and REEs provided by a plurality of processors. Each of the system entities is identified by a corresponding AID and protected by a corresponding one of the SRPUs.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A, 3B, and 3C illustrate information used for building the data structure of FIG. 2 according to one embodiment.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a security scheme for memory access and process execution. The security scheme is enforced by multiple system resource protection units (SRPUs) located in multiple system entities (also referred to as "entities") in a system. The system entities include sub-systems, execution environments, processing or co-processing modules, and other components in the system. Examples of the system entities include, but are not limited to: trusted execution environments (TEEs), rich execution environments (REEs), I/O sub-systems, memory sub-systems, and co-processing modules. Each system entity includes both software elements and the underlying firmware and hardware elements. Each system entity is assigned a unique access identifier (AID) and memory address space for access to memory and I/O. Each system entity also includes an SRPU which grants or rejects an access request based on, among other things, the requested memory address, the source AID and the target AID. The security scheme is highly scalable. By using an SRPU in each system entity, the security of the system can scale with the size of the system.

In one embodiment, the security scheme described herein may apply to a system located on a semiconductor chip; e.g., System-on-a-Chip (SoC). However, it is understood that the security scheme described herein is also applicable to a system located on more than one chip. Examples of the system include, but are not limited to, a computing and/or communication device (e.g., a smartphone, a tablet, a laptop, a desktop, a server, a gateway, an Internet-of-Things (IoT) device, a wearable device, an infotainment device, a gaming device, etc.).

Figure 1:
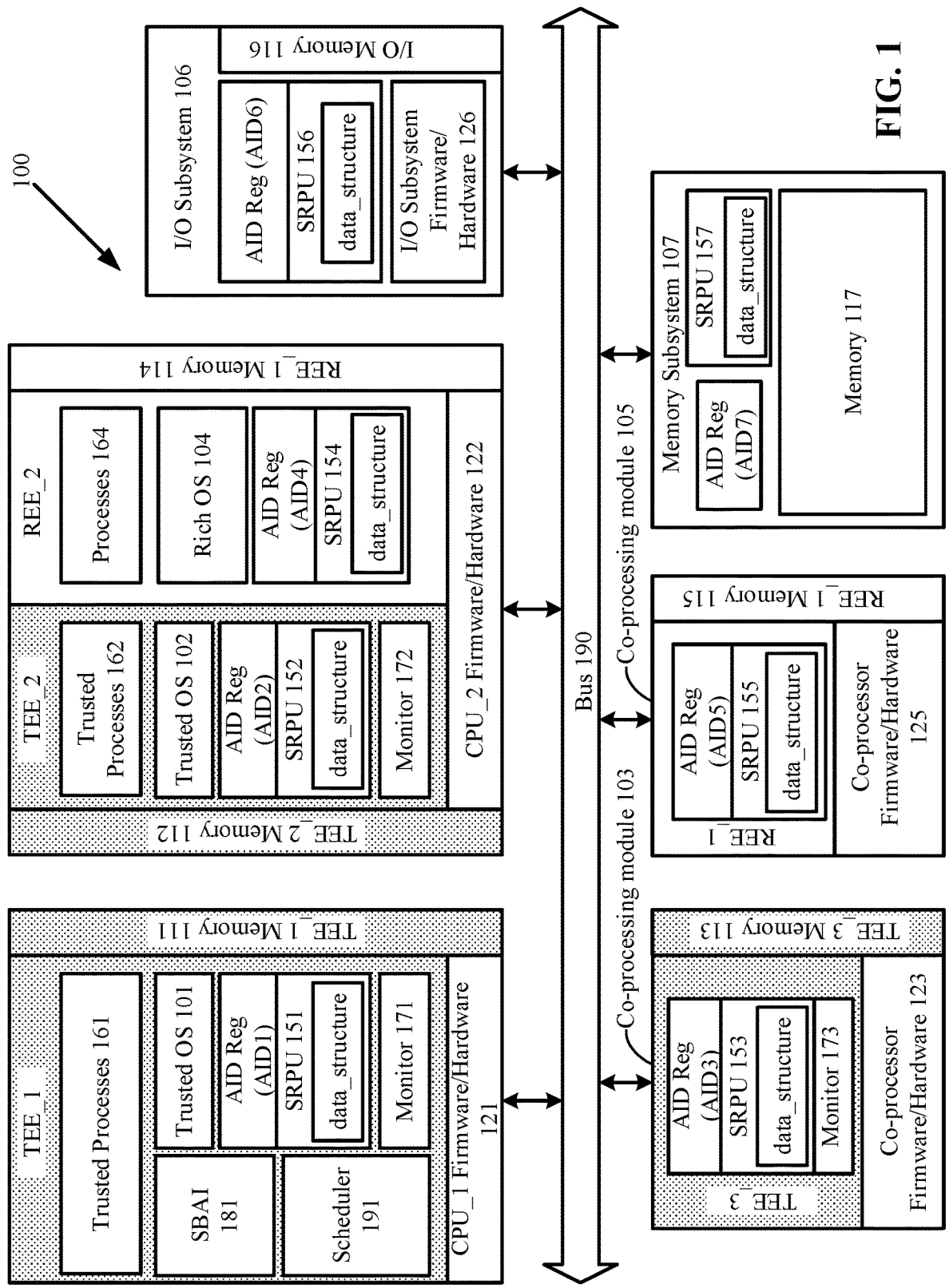
FIG. 1 illustrates an example of a system in which embodiments of the invention may operate.

FIG. 1 illustrates an example of a system 100 in which embodiments of the invention may operate. The system 100 includes multiple system entities, such as TEE_1, TEE_2, TEE_3, REE_1, REE_2, I/O subsystem 106 and memory subsystem 107, all of which are coupled via a bus 190 or another type of interconnection. It is understood that the system 100 may include any number of TEEs and REEs, and these TEEs and REEs may be hosted on any central processing units (CPUs), processor cores, and co-processors such as graphics processing units (GPUs), digital processing units (DSPs), artificial intelligence (AI) processors, and the like. TEE_1 and TEE_2 are trusted execution environments hosted on CPU_1 and CPU_2, respectively; more specifically, TEE_1 and TEE_2 are hosted on CPU_1 firmware and hardware 121 and CPU_2 firmware and hardware 122, respectively. A processor may host more than one execution environment of the same type (e.g., two or more TEEs, or two or more REEs), or more than one execution environment of different types (e.g., a combination of TEE(s) and REE(s)). For example, CPU_2 firmware and hardware 122 hosts both TEE_2 and REE_2. Moreover, the system 100 includes two co-processing modules 103 and 105, the I/O subsystem 106, and the memory subsystem 107. Although a specific number of system entities are shown in FIG. 1, it is understood that the system 100 may include any number of CPUs, execution environments, co-processing modules, and subsystems.

Each of the system entities in the system 100 is assigned a unique AID (e.g., AID1-AID7) stored in a corresponding AID register. In one embodiment, the AIDs are generated by a system boot and AID initialization (SBAI) unit 181. In one embodiment, the SBAI unit 181 is a trusted process in a TEE (e.g., TEE_1) and is executed by one of the CPUs in the system 100 (e.g., CPU_1). In one embodiment, the SBAI unit 181 may include a random number generator to generate AIDs when the system 100 is powered on. In one embodiment, each AID may be a sequence of random numbers.

Each of the system entities includes a corresponding SRPU (e.g., SRPU 151-157). In one embodiment, each SRPU includes a combination of hardware and software components to enforce secured memory access. Each SRPU includes a data structure to keep track of the AIDs that are allowed to access memory locations allocated to its corresponding system entity. The term "data structure" herein refers to a collection of tables, lists, and/or other data organizations. Further details about the data structure will be provided later in connection with FIG. 2.

In one embodiment, the data structure is built by a scheduler 191, which may be a trusted process in a TEE (e.g., TEE_1) and is executed by one of the CPUs in the system 100 (e.g., CPU_1). The scheduler 191 schedules and assigns tasks (e.g., processes and/or trusted processes) to a system entity or across multiple system entities. For example, the scheduler 191 may distribute the processes of a task to multiple system entities such as multiple TEEs or multiple REEs. The scheduler 191 configures data structures of these multiple system entities to allow access among the multiple system entities for executing the task. As shown in FIG. 1, the system 100 may include a single SBAI unit 181 and a single scheduler 191.

In one embodiment, each of the TEEs includes a corresponding monitor (e.g., monitor 171, 172 or 173). The monitors 171-173 can perform inter-TEEs communication to allow TEEs to communicate with one another. Among other features, each monitor 171-173 can determine whether an attack has occurred, or has likely occurred, to its host entity (e.g., TEE_1 is the host entity of monitor 171). Upon detecting an attack or a potential attack, the monitor 171-173 can request the scheduler 191 to revoke the AID of the entity under attack (i.e., the attacked entity). The revocation of the AID can isolate the attacked entity from the other system entities. The attacked entity can later re-join the system 100 when the threat of the attack is removed.

Each of the co-processing modules 103 and 105 may contain one or more TEEs, REEs, a combination of both, or neither a TEE nor an REE. In this example, co-processor firmware and hardware 123 hosts TEE_3, and co-processor firmware and hardware 125 hosts REE_1. TEE_3 is assigned AID3 and has a corresponding SRPU 153, and REE_1 is assigned AID5 and has a corresponding SRPU 155.

The I/O subsystem 106 may include I/O devices such as a display, a camera, a speakerphone, a touchpad, a network interface, radio-frequency (RF) components, etc. The I/O subsystem 106 provides the system 100 with access to networks such as a public network, a proprietary network, a wireless network, a wired network, or any combinations of the above; e.g., a cellular network, the Internet, a wide-area network, a Wi-Fi network, a local area network, a personal area network, etc. The I/O subsystem 106 may contain one or more TEEs, REEs, a combination of both, or neither a TEE nor an REE. In this example, the I/O subsystem 106 is assigned an AID (e.g., AID6) and has a corresponding SRPU 156 hosted by I/O subsystem firmware and hardware 126. The I/O subsystem 106 has an allocated memory address space (e.g., I/O memory 116), which may be memory-mapped I/O whose locations are described by memory page addresses. Alternatively, the I/O memory 116 may include a set of I/O buffers identified by respective buffer pointers.

The memory subsystem 107 includes memory devices (e.g., random access memory (RAM) such as dynamic RAM (DRAM) devices, static RAM (SRAM) devices, and/or other volatile or nonvolatile memory devices) collectively referred to as the memory 117. The memory subsystem 107 is assigned an AID (e.g., AID7) and has a corresponding SRPU 157. In one embodiment, the SRPU 157 may be part of a memory controller logic (not shown) which controls the access to a secure portion of the memory 117.

The memory address space of the system 100 may be allocated to some or all of the system entities. For example, TEE_1 memory 111, TEE_2 memory 112, REE_2 memory 113, TEE_3 memory 114, REE_1 memory 115, the I/O memory 116 and the memory 117 may each be assigned a different portion of the memory address space. Although the memory 111-117 are shown as separate blocks, some of the memory 111-117 may locate in the same physical memory device. The access to each of the memory 111-117 is protected by the corresponding SRPUs 151-157, respectively. The memory address space can also be referred to as a system resource.

In the embodiment of FIG. 1, CPU_1 and CPU_2 execute a number of operating systems. Trusted operating systems 101 and 102 are secure operating systems which manage system resources for TEE_1 and TEE_2, respectively. A rich operating system (Rich OS) 104 (e.g., Linux®, Android®, iOS®, Windows®, etc.) manages the system resources for REE_2. In some embodiments, CPU_1 and/or CPU_2 may host a hypervisor that runs virtual machines. CPU_1 and CPU_2 may execute a number of processes, including trusted processes 161 and 162 in TEE1 and TEE_2, respectively, and processes 164 in REE_2. In one embodiment, CPU_1 and CPU_2 may send commands or requests to the co-processors (e.g., the co-processor firmware and hardware 123 and 125), the I/O subsystem 106, and the memory subsystem 107 when executing the processes 161, 162 or 164.

Secure user applications may be executed by the system 100 in TEEs; e.g., by CPU_1 and/or CPU_2. A secure user application may include one or more of the trusted processes 161 and 162. In one embodiment, each secure user application in a TEE is assigned an AID alias, which may be derived from the AID of the TEE. For example, the trusted OS 102 in TEE_2 may generate AID aliases from AID2 (the AID of TEE_2), and assigns each AID alias to a secure user application running in TEE_2. The trusted OS 102 may further generate access control information for each secure user application to indicate memory address space allocation and access restrictions to the secure user application. In the example of TEE_2, the per-application access control information is used by SRPU 152 to determine whether a source entity can access the allocated memory address space of a secure user application in TEE_2. In one embodiment, SRPU 152 first uses a data structure (e.g., a data structure 200 to be described in FIG. 2) to determine whether a source entity is allowed to access the target entity (e.g., TEE_2). If the source entity is allowed to access TEE_2 according to the data structure, SRPU 152 further determines whether the memory address space of the target user application in TEE_2 can be accessed by the source entity according to the access control information of the target user application.

As such, the system resource owned by (e.g., allocated to) a user application in any TEE totally belongs to that user application, and cannot be accessed by any other application in the same TEE, other TEEs or REEs. In one embodiment, the system resource is allocated to a user application only during its execution. The allocation is released after the execution of the user application. When a user application residing in multiple TEEs, the multiple TEEs collaborate to ensure consistent access across the system resources allocated to the user application. These allocated system resources cannot be accessed by other applications in any of the TEEs or REEs. In one embodiment, these system resources are allocated to the user application for a period of time and then released.

Figure 2:
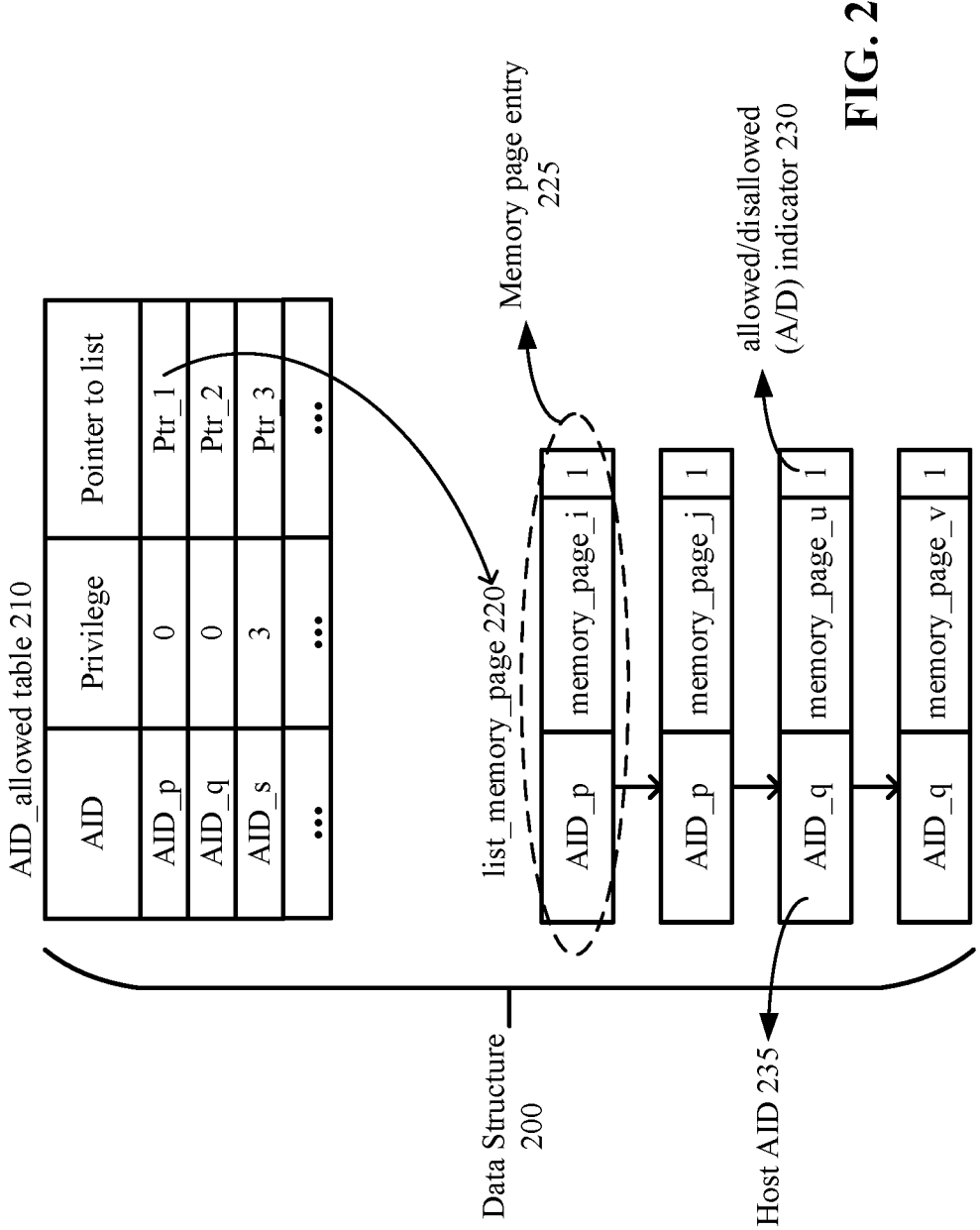
FIG. 2 illustrates a data structure used by a system resource protection unit (SRPU) according to one embodiment.

FIG. 2 illustrates a data structure 200 used by each of SRPUs 151-157 of FIG. 1 according to one embodiment. For ease of description, TEE_2 in FIG. 1 is used as an example of a target entity, which hosts SRPU 152 and the data structure 200. The data structure 200 includes an AID_allowed table 210, which stores information about entities allowed to access memory locations allocated to the target entity (e.g., TEE_2 in this example). It is understood that the same or analogous data structure may be used in any TEE, REE, co-processing module, I/O subsystem, and memory subsystem in the system 100 of FIG. 1.

The AID_allowed table 210 includes at least three fields: an AID field, a privilege field, and a pointer to list field. These fields may be arranged into three columns of the AID_allowed table 210; however, alternative arrangements may be used. SRPU 152 uses the AID_allowed table 210 to identify the entities (by their AIDS) allowed to access the TEE_2 memory 112. For each AID in the first column of the AID_allowed table 210, its privilege is also identified. In one embodiment, there may be four privilege levels, from low to high: user code/data has a privilege level=0, a Rich OS has a privilege level=1, a hypervisor has a privilege level=2, and a monitor of a TEE has a privilege level=3. The privilege level provides information about the requestor (i.e., the entity sending an access request). The information can be used by the target entity receiving the access request (specifically, the target SRPU) to determine whether to grant or to reject the access request.

For brevity of the description and in accordance with the common usage in the field, the term "user data" hereinafter is used to collectively refer to "user code and/or data." Furthermore, the term "higher-privileged software" refers to software that has a higher privilege than user data. In one embodiment, "higher-privileged software" is indicated by a privilege level greater than 0, as user data has a privilege level of 0.

In one embodiment, the third column of the AID_allowed table 210 includes a pointer that points to a list of memory page addresses. In one embodiment, the memory page addresses are physical addresses. In another embodiment, the memory page addresses may be a memory address range. For each AID in the first column of the AID_allowed table 210, the pointer points to (e.g., by providing the address of) the head of a list of memory page addresses. For example, the first row of the AID_allowed table 210 includes AID_p, a privilege level=0, and a pointer Ptr_1 that points to a list_memory_page 220 (also referred to as the "list 220"). That is, a user process or application in the system entity identified by AID_p is allowed to access the memory pages in the list 220. In the example of FIG. 2, the list 220 includes four memory page entries, also referred to as entries (for simplicity, only the first entry 225 is labeled). Each entry in the list 220 includes a host AID 235, the address of a memory page, and an allowed/disallowed indicator ("A/D indicator 230"). The host AID 235 in the entry (e.g., AID_p or AID_q), identifies the entity that owns (i.e., is allocated with) the memory page. The default setting of the A/D indicator 230 is "allowed" (e.g., represented by a value of "1"), which indicates that the memory page in the same entry is accessible. A user or system administrator may, via an application programming interface (API), change the default setting of the A/D indicator 230 to indicate "disallowed" (e.g., represented by a value of "0"). The "disallowed" indication may be applied to the access requests coming from a higher-privileged entity, software, or process. For example, when the A/D indicator 230 is 0 for a given memory page of user data, the target SRPU rejects all access requests coming from entities with privilege levels 1, 2, and 3 for that given memory page. For example, in the AID_allowed table 210, access requests to user data from AID_s (which has a privilege level=3) are rejected as AID_s has a privilege level of 3. As such, user data can be protected from access by higher-privileged software.

In a cloud service scenario, Company A may rent system resources (e.g., processing power, memory, storage, etc.) from a cloud provider to provide a service to Company A's customers. The customers' data and code need to be protected from unauthorized access, including access by the cloud provider. To prevent the cloud provider's software to access the data and code of Company A's customers, an administrator of Company A can indicate to the system that higher-privileged software is disallowed to access user data stored within Company A's allocated memory address space. In response to the administrator's indication, the scheduler (e.g., the scheduler 191 of FIG. 1) can execute an AID_disallow operation to set the A/D indicators of those memory pages storing Company A's user data to zero.

In one embodiment, the SRPU performs access checks on both incoming and outgoing access requests. For example, when a source entity (AID_j) sends a request to a target entity (AID_k) to access memory_page_k, the source SRPU at the source entity grants the request if AID_k and memory_page_k are in the AID_allowed table of the source entity. Upon receiving the request, the target SRPU at the target entity also checks its AID_allowed table to determine (1) whether AID_j is in the table, (2) whether the list_memory_page corresponding to AID_j includes memory_page_k, and either (3) whether AID_j has a privilege level equal to 0, or (4) when AID_j has a privilege level greater than 0 and memory_page_k stores user data, whether the A/D indicator 230 for memory_page_k indicates "allowed." The target SRPU grants access to memory_page_k if all of (1), (2) and (3) are true, or if all of (1), (2) and (4) are true.

In some embodiments where the I/O subsystem 106 (FIG. 1) is not memory-mapped, the pointer to list field in the AID_allowed table 210 may further include a pointer pointing to a list_buffer_pointer. Each entry in the list_buffer_pointer identifies a buffer instead of a memory page in the list_memory_page.

A scheduler (e.g., the scheduler 191 in FIG. 1) can update the data structure 200 from time to time; e.g., when the allocation of memory address space to a system entity is changed. In some embodiments, a system resource can be allocated to a group of TEEs for a period of time and then released. A system resource allocated to an REE or a group of REEs can be "borrowed" (e.g., re-allocated) temporarily by a TEE or a group of TEEs. During the "borrowed" period, the system resource can only be accessed by TEE(s) securely until it is released. Moreover, the data structure 200 can be used to indicate the following: a TEE is allowed to access a system resource allocated to an REE, a system resource allocated to a TEE cannot be accessed by an REE unless permission is given, and a system resource allocated to a TEE cannot be accessed by other TEEs unless permission is given.

FIGS. 3A, 3B, and 3C illustrate example information used for building the data structure 200 of FIG. 2 according to one embodiment. FIG. 3A shows an example of process control blocks (PCBs), which are provided by an operating system to indicate the memory allocation for each process (identified by a process ID (PID)). FIG. 3B shows the mapping between PIDs and AIDs. The mapping may be one-to-one or many-to-one. That is, one PID may be mapped to one AID, or many PIDs may be mapped to one AID. FIG. 3C shows an example of connectivity information which shows the dependencies among the PIDs; e.g., which process calls which other processes. The connectivity information may be provided by a compiler. The example of FIG. 3C shows a collection of linear connections between PIDs; however, the connectivity may be represented by a graph of a different shape. Using the information shown in FIGS. 3A, 3B, and 3C, plus the privilege information of each AID, the scheduler can build the AID_allowed tables for all of the SRPUs in the system.

Figure 4:
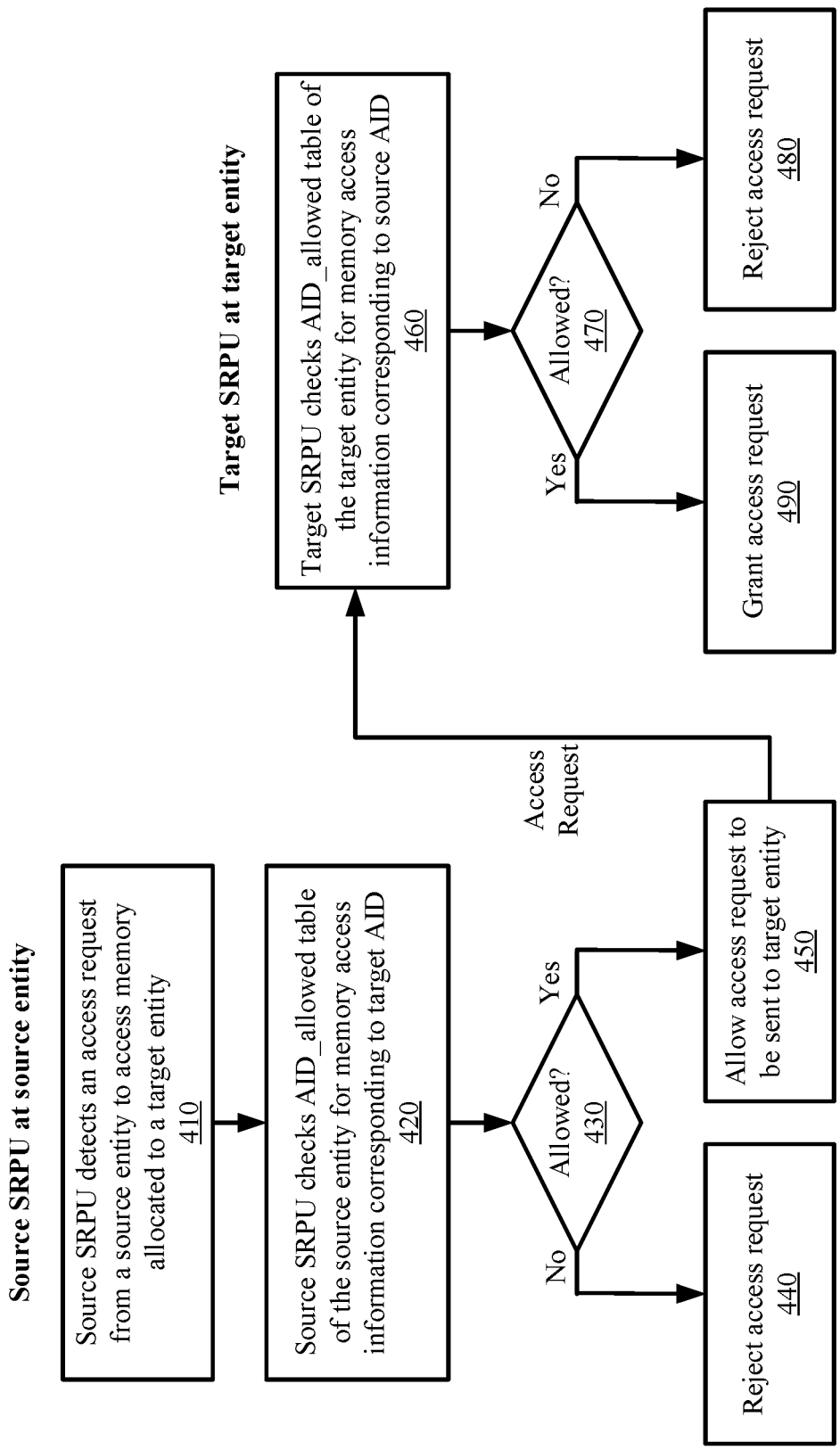
FIG. 4 is a flow diagram illustrating operations performed by SRPUs according to one embodiment.

FIG. 4 is a flow diagram illustrating operations performed by SRPUs according to one embodiment. More specifically, the operations are performed by a source SRPU at a source entity and a target SRPU at a target entity, where the source entity is the system entity that sends an access request and the target entity is the system entity that receives the access request. Furthermore, the source entity is identified by a source AID and the target entity is identified by a target AID. The source SRPU and the target SRPU may perform address translations from a virtual address to a corresponding physical address to determine the memory location to be accessed.

At step 410, a source SRPU detects an access request from a source entity to access memory locations allocated to a target entity. At step 420, the source SRPU checks the AID_allowed table of the source entity for memory access information corresponding to the target AID. At step 430, the source SRPU determines whether the source entity can access the memory locations allocated to the target entity; e.g., the access is allowed if the target AID and the memory location to be accessed are in the AID_allowed table. The source SRPU rejects the access request at step 440 if it determines that the access request is disallowed. If the source SRPU determines that the access request is allowed, the source entity sends the access request to the target entity at step 450.

At step 460, the target SRPU checks the AID_allowed table of the target entity for memory access information corresponding to the source AID. Based on the information, the target SRPU at step 470 determines whether the source entity can access the memory locations allocated to the target entity; e.g., the access is allowed if the source AID and the memory location to be accessed are in the AID_allowed table. The access is disallowed otherwise. Additionally, the access may be disallowed if the source AID has a privilege level greater than 0 and the A/D indicator corresponding to the memory location is 0 ("disallowed"), where the memory location stores user data. The target SRPU rejects the access request at step 480 if it determines that the access request is disallowed. The target SRPU grants the access request to the target entity at step 490 if it determines that the access request is allowed.

Figure 5:
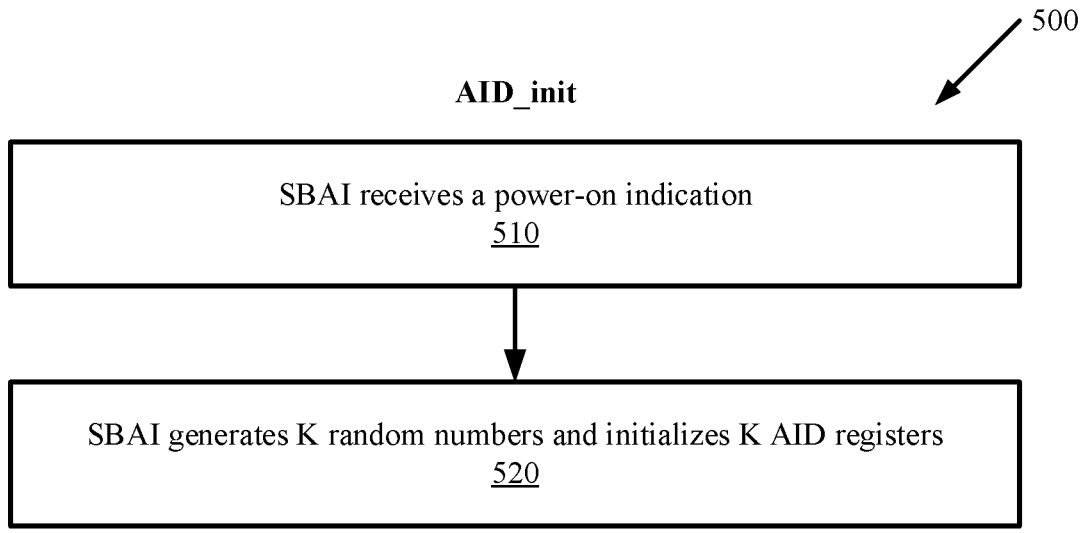
FIG. 5 is a flow diagram illustrating a process for initializing an access identifier (AID) according to one embodiment.

FIG. 5 is a flow diagram illustrating an AID initialization process 500 (i.e., AID_init) according to one embodiment. Referring also to FIG. 1, when the system 100 is powered on, the SBAI unit 181 receives a power-on indication at step 510. In response to the indication, at step 520, the SBAI unit 181 generates K random numbers which are used to initialize K AID registers, where K is the number of system entities. After the AIDs are initialized, new system entities may be added to the system 100 and existing system entities may be removed, as will be described in connection with FIG. 6 and FIG. 7, respectively.

Figure 6:
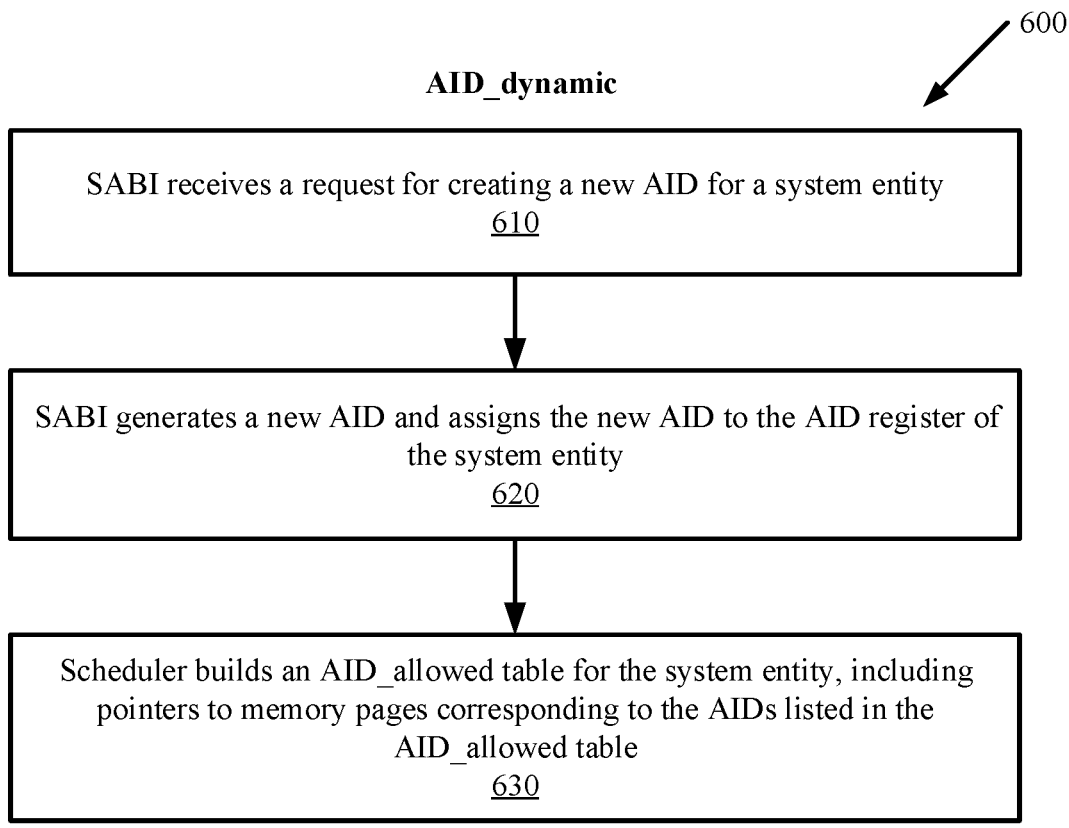
FIG. 6 is a flow diagram illustrating a process for creating a new AID during runtime according to one embodiment.

FIG. 6 is a flow diagram illustrating a process 600 (i.e., AID_dynamic) of creating a new AID during runtime according to one embodiment. At step 610, the SABI unit 181 receives a request for creating a new AID for a system entity. At step 620, the SABI unit 181 generates a new AID and assigns the new AID to the AID register of the system entity. At step 630, the scheduler 191 builds an AID_allowed table for the system entity, including privilege levels and pointers to memory pages corresponding to the AIDs listed in the AID_allowed table.

Figure 7:
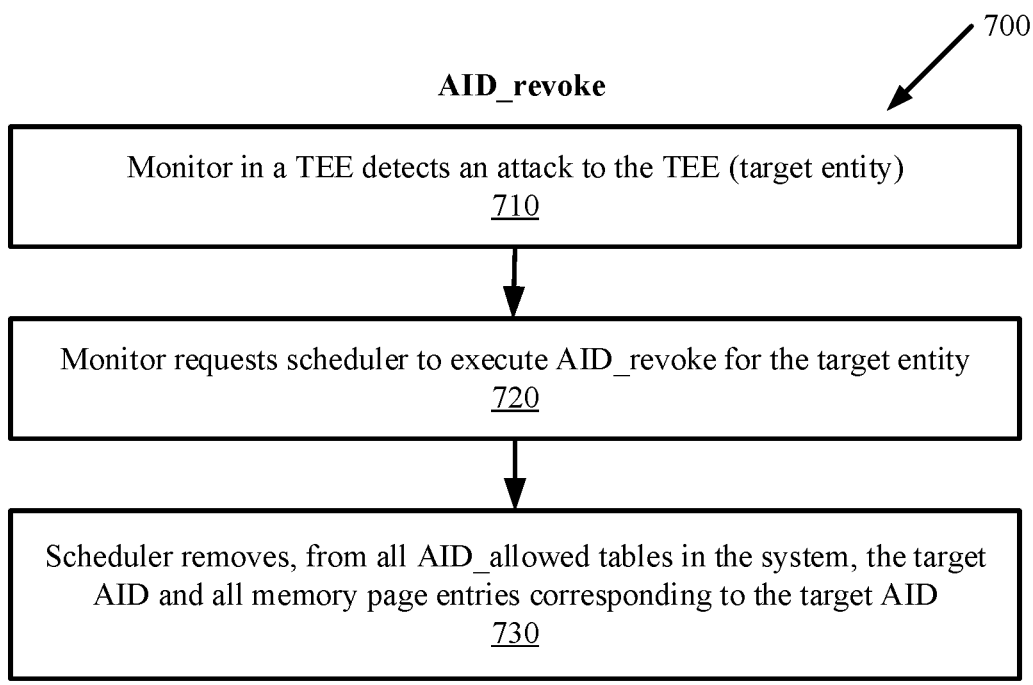
FIG. 7 is a flow diagram illustrating a process for revoking an existing AID during runtime according to one embodiment.

FIG. 7 is a flow diagram illustrating a process 700 (i.e., AID revoke) of revoking an existing AID during runtime according to one embodiment. At step 710, the monitor in a TEE detects an attack on the TEE. This TEE is also referred to as an attacked entity. The monitor at step 710 requests the scheduler to execute AID revoke. In response to the request, the scheduler at step 720 removes, from all AID_allowed tables used by all SRPUs in the system, the attacked entity's AID, and the memory page entries corresponding to the attacked entity's AID.

Figure 8:
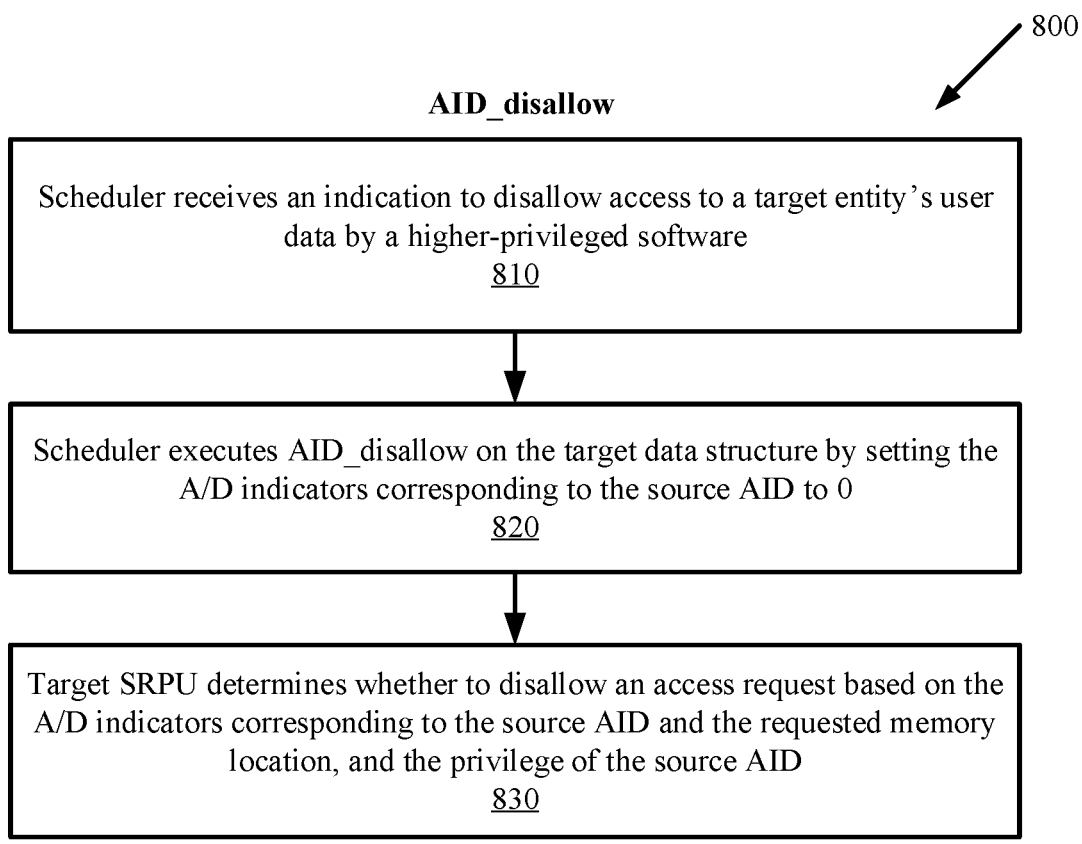
FIG. 8 is a flow diagram illustrating a process for disallowing an AID from access according to one embodiment.

FIG. 8 is a flow diagram illustrating a process 800 (i.e., AID_disallow) of disallowing an access request from a source entity according to one embodiment. During the process 800, the A/D indicators are set to indicate, and are used to determine, whether higher-privileged software are allowed or disallowed to access a target entity's user data.

At step 810, the scheduler receives an indication to disallow access to a target entity's user data by higher-privileged software. The higher-privileged software is executed by a source entity identified by a source AID. In one embodiment, a user or an administrator may provide the indication of disallowed access to the system via an API. The scheduler executes, at step 820, AID_disallow on the data structure of the target entity (referred to as the "target data structure") by setting the A/D indicators corresponding to the source AID to 0. More specifically, AID_disallow overwrites the default setting of the A/D indicators corresponding to the source AID in the target data structure; e.g., the default setting may be 1 to indicate "allowed," and the new setting may be 0 to indicate "disallowed." The target SRPU controls access from higher-privileged software based on, at least in part, the setting of the A/D indicators. At step 830, the target SRPU determines whether to disallow an access request based on the A/D indicators corresponding to the source AID and the requested memory location, and the privilege of the source AID. For example, the access request may indicate (source AID, target AID, requested memory_page_address). The target SRPU finds, from the target data structure, the source AID has a privilege level=3 and the A/D indicator of the requested memory_page_address is 0. As a result, the SRPU rejects the access request to protect the user data from access by a higher-privileged software.

Figure 9:
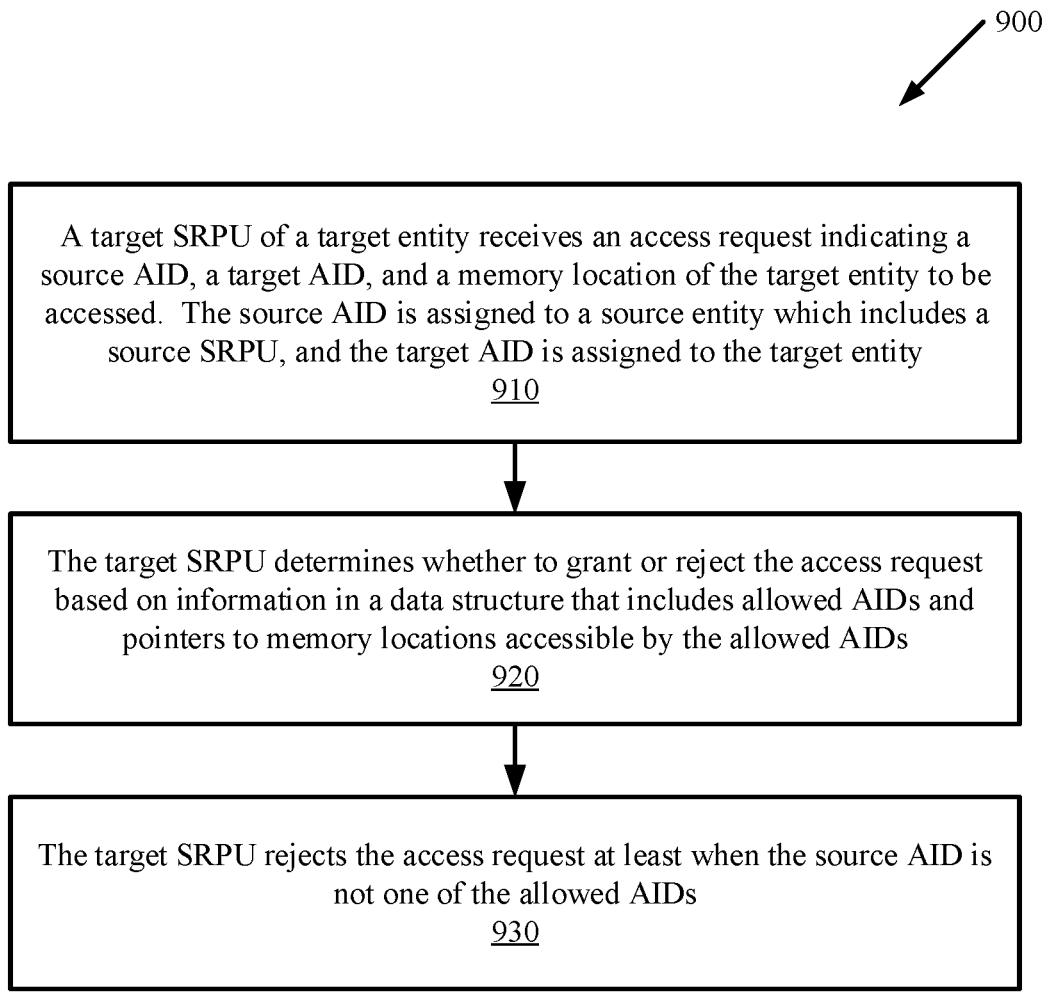
FIG. 9 is a flow diagram illustrating a method for performing secure operations by a system according to one embodiment.

FIG. 9 is a flow diagram illustrating a method 900 for performing secures operations by a system according to one embodiment. The system includes multiple SRPUs. As an example, the method 900 may be performed by the system 100 of FIG. 1; more specifically, by the SRPUs 151-157 of FIG. 1.

The method 900 begins at step 910 when a target SRPU of a target entity receives an access request indicating a source AID, a target AID, and a memory location of the target entity to be accessed. The source AID is assigned to a source entity which includes a source SRPU, and the target AID is assigned to the target entity. The target SRPU at step 920 determines whether to grant or reject the access request based on information in a data structure that includes allowed AIDs and pointers to memory locations accessible by the allowed AIDs. The target SRPU at step 930 rejects the access request at least when the source AID is not one of the allowed AIDs.

Referring to the method 900, the source entity and the target entity are system entities that include at least an I/O subsystem, a memory subsystem, and TEEs and REEs provided by multiple processors. Each of the system entities is identified by a corresponding AID and protected by a corresponding one of the SRPUs. In some embodiments, the system entities further include one or more co-processing modules, each of which is executed by a corresponding co-processor. In one embodiment, based on access control information of a secure user application in a TEE, the corresponding SRPU of the TEE is operative to deny access to memory address space allocated to the secure user application by other user applications in the TEEs and the REEs.

In one embodiment, the data structure (e.g., the data structure 200 of FIG. 2), which includes allowed AIDs and pointers to memory locations accessible by the allowed AIDs, further includes a privilege level of each allowed AID. Each of the memory locations accessible by the allowed AIDs is marked by an A/D indicator to indicate whether the memory location is accessible by a process having a higher privilege than user code and data.

The operations of the flow diagrams of FIGS. 4-9 have been described with reference to the exemplary embodiment of FIG. 1. However, it should be understood that the operations of the flow diagrams of FIGS. 4-9 can be performed by embodiments of the invention other than the embodiment of FIG. 1, and the embodiment of FIG. 1 can perform operations different than those discussed with reference to the flow diagrams. While the flow diagrams of FIGS. 4-9 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system operative to perform secure operations, comprising:
   an I/O subsystem;
   a memory subsystem; and
   a plurality of processors to execute a plurality of processes in a plurality of trusted execution environments (TEEs) and a plurality of rich execution environments (REEs), each of the TEEs and the REEs is identified by a corresponding access identifier (AID) and protected by a corresponding system resource protection unit (SRPU),
wherein the corresponding SRPU of a TEE includes instructions, when executed by a corresponding processor cause the corresponding processor to control access to the TEE using a data structure including allowed AIDs and pointers to memory locations accessible by the allowed AIDs, and
wherein one or more of the plurality of processors are operative to execute a first process and a second process during runtime of the system, the first process is operative to remove an existing AID from the system, and the second process is operative to add a new AID to the system.

2. The system of claim 1, wherein the corresponding SRPU of the TEE is further operative to deny access to memory address space allocated to a secure user application in the TEE by other user applications in the TEEs and the REEs based on access control information of the secure user application.

3. The system of claim 1, wherein, when executed by a corresponding one of the processors, a monitor process in each TEE is operative to detect an attack on the TEE and cause an AID of the TEE to be removed from all data structures used by all SRPUs in the system.

4. The system of claim 1, wherein, when executed by one of the processors, a scheduling process is operative to distribute the processes of a task to multiple system entities and to configure data structures of the multiple system entities to allow access among the multiple system entities for executing the task.

5. The system of claim 4, wherein the multiple system entities include a combination of entities selected from the TEEs, the REEs, the I/O subsystem, the memory subsystem, and one or more co-processing modules including corresponding co-processors.

6. The system of claim 1, wherein the first process is a scheduling process and the second process is a system boot and AID initialization (SBAI) process, and wherein during runtime of the system when executed by one or more of the processors, the scheduling process is operative to remove the existing AID from all data structures in the system, and the SBAI process is operative to add one or more AIDs to the system.

7. The system of claim 1, wherein, when executed by one of the processors, a scheduling process is operative to update the data structure when allocation of the memory address space is changed.

8. The system of claim 1, wherein the I/O subsystem is assigned a first SRPU and a first AID, the first SRPU operative to control access to and from memory allocated to the I/O subsystem, and wherein the memory subsystem is assigned a second SRPU and a second AID, the second SRPU operative to control access to and from a secure portion of the memory subsystem.

9. The system of claim 1, further comprising:
a co-processing module assigned a third SRPU and a third AID, the third SRPU via a corresponding co-processor is operative to control access to and from the co-processing module.

10. The system of claim 1, wherein, when executed by a corresponding one of the processors, a system boot and AID initialization (SBAI) process is operative to generate AIDs and initialize AID registers with the generated AIDs when the system is powered on.

11. The system of claim 1, wherein the data structure further includes a privilege level of each allowed AID.

12. The system of claim 1, wherein each of the memory locations accessible by the allowed AIDs is marked by an allowed/disallowed (A/D) indicator to indicate whether the memory location is accessible by a process having a higher privilege than user code and data.

13. The system of claim 12, further comprising an application programming interface (API) via which a user of the system sets the A/D indicator to indicate disallowed access to the memory location.

14. The system of claim 1, wherein each of the memory locations accessible by the allowed AIDs is marked by a host AID identifying a system entity that is allocated with the memory location.

15. A method for performing secure operations by a system that includes a plurality of system resource protection units (SRPUs), comprising:
receiving, by a target SRPU of a target entity, an access request indicating a source access identifier (AID), a target AID, and a memory location of the target entity to be accessed, wherein the source AID is assigned to a source entity including a source SRPU, and the target AID is assigned to the target entity;
determining, by the target SRPU, whether to grant or reject the access request based on information in a data structure including allowed AIDs and pointers to memory locations accessible by the allowed AIDs;
rejecting the access request at least when the source AID is not one of the allowed AIDs, wherein the source entity and the target entity are system entities that include at least an I/O subsystem, a memory subsystem, and a plurality of trusted execution environments (TEEs) and rich execution environments (REEs) provided by a plurality of processors, each of the system entities is identified by a corresponding AID and protected by a corresponding one of the SRPUs, and
executing a first process during runtime of the system to remove an existing AID from the system; and
executing a second process during runtime of the system to add a new AID to the system.

16. The method of claim 15, further comprising:
executing a monitor process in each TEE to detect an attack on the TEE and cause an AID of the TEE to be removed from all data structures used by all of the SRPUs in the system.

17. The method of claim 15, further comprising:
executing a scheduling process to distribute processes of a task to multiple ones of the system entities and to configure data structures of the multiple system entities to allow access among the multiple system entities for executing the task.

18. The method of claim 15, wherein the system entities further include one or more co-processing modules including corresponding co-processors.

19. The method of claim 15, further comprising:
executing a scheduling process to update the data structure when allocation of the memory locations is changed.

20. The method of claim 15, wherein each of the memory locations accessible by the allowed AIDs is marked by an allowed/disallowed (A/D) indicator to indicate whether the memory location is accessible by a process having a higher privilege than user code and data.

* * * * *